United States Patent [19]

Thelen

[11] 4,247,742
[45] Jan. 27, 1981

[54] TRUNK TEST CIRCUIT
[75] Inventor: William Thelen, Glen Ellyn, Ill.
[73] Assignee: Bell Telephone Laboratories, Incorporated, Murray Hill, N.J.
[21] Appl. No.: 79,100
[22] Filed: Sep. 26, 1979
[51] Int. Cl.³ .............................. H04B 3/46
[52] U.S. Cl. .............................. 179/175.3 R
[58] Field of Search ........... 179/175.3 R, 175.2 R, 179/175.2 C, 170 R; 324/52, 58 A; 328/162; 178/69 A

[56] References Cited

U.S. PATENT DOCUMENTS

| | | | |
|---|---|---|---|
| 2,666,099 | 1/1954 | Bonner | 179/175.3 R |
| 2,721,235 | 10/1955 | McKim et al. | 179/175.3 R |
| 3,777,081 | 12/1973 | Vierling et al. | 179/175.3 R |
| 3,920,935 | 11/1975 | Vierling et al. | 179/175.3 R |
| 4,086,448 | 4/1978 | Anglikowski | 179/175.3 R |
| 4,170,722 | 10/1979 | Blackburn | 179/175.3 R |

*Primary Examiner*—Thomas A. Robinson
*Attorney, Agent, or Firm*—Peter Visserman

[57] ABSTRACT

A trunk test circuit (107) is disclosed in a stored program controlled toll switching system (103) for executing tests to determine transmission quality of communication trunks connected to a remote telephone office (101). A detector circuit (200) has a novel feedback arrangement comprising a selectable frequency source, comparison circuitry, and a sample and hold circuit, for generating output test signals corresponding to priorly received incoming test signals. The detector circuit is responsive to control signals received from a sequence control circuit (201) for receiving, measuring, and transmitting test signals on a communication trunk (102) under test.

14 Claims, 3 Drawing Figures

TRUNK TEST CIRCUIT

TECHNICAL FIELD

This invention relates to telecommunication circuits and, more particularly, to test circuits for measuring transmission characteristics of communication trunks connected thereto.

BACKGROUND OF THE INVENTION

Modern telecommunication systems require that the communication lines and trunks connecting a central office system to subscriber stations and other offices be maintained at a high performance level. It is necessary, therefore, to provide means to accurately measure transmission characteristics of the communication lines and trunks with minimum service interruption. Specifically, in toll offices which have extensive trunk interconnections with other telephone offices, trunk test circuits must be provided which effectuate accurate and convenient measurement of losses and noise levels associated with signal transmission in each direction on the trunks. Often, a modern toll office will have automated trunk test apparatus which requires sophisticated equipment at the remote office. For a small remote office having a small number of interoffice trunk connections, on-premises test equipment necessary to utilize modern automated test apparatus at a connected toll office may be prohibitively expensive.

Customarily, for the small remote office, trunk test functions are accomplished via manual procedures at a testboard terminal within the remote office and partially automated circuits. The prior art describes two alternatives for the toll office, when manual trunk testing is required at the remote office. The first alternative is to provide manual testboard-to-testboard testing functions, thereby necessitating a craftsperson at the toll office testboard terminal. Such manual testing fails to take advantage of the sophisticated electronic equipment generally available in a modern toll office. The second alternative is to provide an automated trunk test circuit at the toll office which is compatible with manual testboard procedures at the remote office. A prior art arrangement in accordance with the second alternative is described in U.S. Pat. No. 2,721,235, B. McKim et al. However, the circuit arrangement described in the McKim et al. patent utilizes high impedance vacuum tubes and electromechanical devices which are incompatible with the speed of execution of associated circuitry in a modern telephone office. Further, the prior art arrangements generally do not provide the precision required for accurately measuring transmission characteristics of trunk circuitry of modern electric telephone offices.

SUMMARY OF THE INVENTION

Advantageously, in accordance with the invention, a technical advance is achieved in a trunk test circuit for measuring transmission characteristics of a communications trunk connected thereto by retaining the received level of an incoming test signal by means of a feedback circuit arrangement. The received level of the incoming test signal is retained for purposes of generating an outgoing test signal having an amplitude corresponding to that of the incoming test signal at a time subsequent to the time of occurrence of the incoming test signal. The feedback circuit arrangement further provides automatic compensation for variations in parameters of circuitry comprising the trunk test circuit.

The trunk test circuit comprises input and output terminals connectible to a communication trunk and a variable amplitude signal generator circuit for generating a continuous stream of test signals. A comparison circuit connected to the signal generator circuit and to the test circuit input terminals generates a signal indicative of the difference in amplitude between the incoming test signal and the continuous stream of test signals. The signal generator circuit in response to the comparator output signal adjusts the amplitude of the generated test signals so as to reduce the difference in amplitude between generated signals and the incoming test signal. Further, the test circuit comprises means for disconnecting the comparator from the signal generator circuit when the generated test signals are substantially equal in amplitude to the incoming test signal. This amplitude of the generated test signals will be maintained and the signal generator circuit may be connected to the test circuit output terminals at a later time. Accordingly, a stream of test signals of an amplitude equal to that of the incoming test signal may be provided after the incoming test signal has ceased.

The signal generator circuit comprises an oscillator circuit for generating time variant signals having predetermined signal characteristics. A holding circuit connected to the comparator retains a signal voltage which is indicative of the amplitude of the incoming test signal. The output signal of the holding circuit is applied to a divider circuit together with the time variant signals to control the amplitude of the generated test signals.

Advantageously, a trunk test circuit in accordance with this invention may further comprise timer and level detection circuits to provide an output signal indicating that an incoming test signal exceeds a minimum level for at least a predetermined period of time. Further, circuitry may be provided to generate an output signal indicating that the amplitude of the generated test signal is within a predetermined difference of the amplitude of the incoming test signal. These output signals may be used to control the activation and operation of the trunk test circuit.

BRIEF DESCRIPTION OF THE DRAWING

The invention may be better understood from the following detailed description when read with reference to the drawing in which.

DETAILED DESCRIPTION

Figure 1:
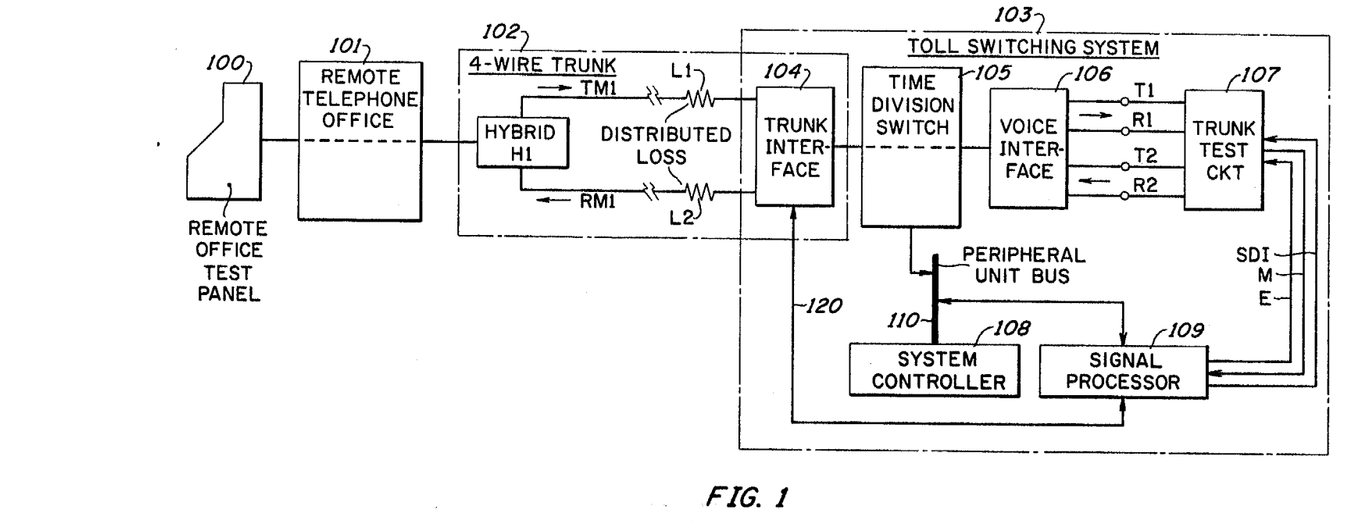
FIG. 1 is a block diagram of one illustrative embodiment of a telecommunication system comprising a trunk test circuit.

The principles of this invention are disclosed, by way of example, in a telephone switching arrangement of the type shown in FIG. 1. A trunk test circuit 107 in a stored program controlled toll switching system 103 is utilized to determine transmission characteristics of a communications trunk 102 connected thereto. As shown in FIG. 1, the communications trunk 102 is connected to a remote telephone office 101. The remote office 101 may be any of the numerous types of local switching telephone offices known in the art and comprises a remote office test panel 100 connected thereto as shown in FIG. 1. The test panel 100 is utilized for purposes of manual testing of communications trunks and subscriber station lines associated with remote office 101. Communications trunk 102 may be any one of the various trunks known in the art and, for purposes of description, is shown as a four-wire trunk of the type generally described in articles entitled "No. 1 Electronic Switching System", *The Bell System Technical Journal,* Vol. 43, No. 5, September 1965. As shown in FIG. 1, trunk 102 comprises a hybrid circuit H1 for converting from two-wire transmission within remote office 101 to a four-wire apparatus for external transmission. These types of apparatus are well known in the telephone transmission art; for example, as disclosed in U.S. Pat. No. 2,666,099, A. L. Bonner. The four-wire communications trunk 102 comprises a pair of unidirectional transmission lines TM1 and RM1 having distributed losses associated therewith shown as L1 and L2 in FIG. 1. Losses L1 and L2 must be within certain limits to maintain acceptable transmission quality on trunk 102. Within switching system 103, communications trunk 102 further comprises a trunk interface circuit 104 utilized for purposes of controlling communication connections between the transmission portion of trunk 102 and switching circuitry within the switching system 103. Trunk interface circuits of the type depicted in FIG. 1 are well known in the art and are generally described in articles entitled "No. 4 ESS", *The Bell System Technical Journal,* Vol. 56, No. 7, September 1977.

For purposes of illustration, the switching system 103 shown in FIG. 1 is depicted as a time division switching system of the type generally described in the aforementioned articles entitled "No. 4 ESS". The trunk interface circuit 104 is connected to a time division switch 105 which selectively connects the trunk circuit 102 to other circuits of the switching system 103. Switching system 103 further comprises a system controller 108 and a signal processor 109 as shown in FIG. 1. The system controller 108 communicates with the various circuits of switching system 103 via the peripheral unit bus 110. The system controller may comprise a stored program processor and memory system as described in the aforementioned articles entitled "No. 4 ESS", *The Bell System Technical Journal.* The signal processor 109 is connected to the trunk interface circuit 104 via conductor 120 and to trunk test circuit 107 by conductors SDI, M and E. It is also connected to a peripheral unit bus 110 and is used to execute various real-time intensive control functions thereby alleviating function executing time within the system controller 108.

For purposes of measuring the transmission characteristics of trunk circuit 102, trunk test circuits are utilized within the switching system 103. When testing is to be performed, the trunk test circuit 107 is interconnected to the trunk interface circuit 104 via the time division switch 105 and a voice interface circuit 106 as shown in FIG. 1. Voice interface circuit 106 is well known in the art and is generally described in the aforementioned articles entitled "No. 4 ESS". The interconnection between the voice interface circuit 106 and the trunk test circuit 107 comprises two pairs of transmission lines, connected to test circuit input and output terminals T1, R1 and T2, R2, respectively. Command signals for initiating execution of functions associated with testing the transmission circuitry of trunk 102 are transmitted to the trunk test circuit 107 from signal processor 109 via the conductors E and SDI as shown in FIG. 1. Information signals, indicating the status of tests executed within the trunk test circuit 107 are transmitted back to the signal processor 109 via conductor M, also shown in FIG. 1.

As is well known in the art, a switching system of the type shown as switching system 103 will comprise numerous interconnections to a plurality of trunks for purposes of voice communication with subscriber stations connected to remote telephone offices. The arrangement of switching system 103 provides the capability to interconnect a trunk test circuit, such as trunk test circuit 107 shown in FIG. 1, to any one of the plurality of trunks for measuring the transmission characteristics thereof. When a craftsperson at the remote office test panel 100 desires to test the particular trunk 102 connecting the remote telephone office 101 to the time division switching system 103, a sequence of test functions is initiated by the craftsperson. The craftsperson initiates the test sequence by utilizing a predetermined trunk access code to seize the particular trunk 102 to be tested. A predetermined directory number is then outpulsed from remote office 101 which is known to switching system 103 as a request for connection of trunk test circuit 107 to trunk 102. While the system controller 108 is executing the requisite connecting control functions, a tone circuit (not shown in the drawing), such as the well-known ringing and tone plant circuit, is connected to trunk 102 via trunk interface circuit 104 and time division switch 105. By means of this connection, a tone signal of predetermined frequency $f_t$, for example, 2225 Hz, is applied to trunk 102. After the controller 108 determines that the test circuit 107 is available, the tone signal is removed from trunk 102 and the test circuit 107 is connected to it. The termination of the tone indicates to the craftsperson that test circuit 107 is prepared for execution of subsequent test functions.

In accordance with the invention, a test sequence may comprise numerous test functions for determining the particular transmission characteristics of trunk 102. Further, various test sequences may be utilized. One such sequence is generally in McKim et al., U.S. Pat. No. 2,721,235 and is utilized herein to describe operation of trunk test circuit 107 in accordance with the invention. Important transmission characteristics measured by any test sequence are the transmission losses and noise characteristics of each transmission line of the particular trunk. For purposes of description of the particular sequence disclosed in the McKim patent, remote telecommunication system 101 is designated the "far end" office, and switching system 103 is designated the "receiving" office. After the craftsperson at the remote office test panel 100 has initiated the test sequence as previously described, and the trunk test circuit 107 has been connected to the particular trunk 102 under test, the craftsperson sends a tone signal at a predetermined level and frequency $f_s$ to the receiving office via the transmitting portion of the trunk under test. For example, the tone signal may be transmitted at 0 dBm and $f_s$ may be 1000 Hz where "dBm" is a quantity defined as decibels above 1 milliwatt. The receiving office receives the tone signal at a level which is indicative of the transmission losses on the transmitting portion of the trunk under test. For example, reception may occur at $-3$ dBm, which signifies a 3 dB loss on the transmitting portion of the trunk. For purposes subsequently described, the trunk test circuit 107 must retain the level of the receive signal for later transmission. Test circuit 107 now transmits a tone signal at a predetermined level and frequency to the far end office via the receiving portion of the trunk under test. The purpose of this transmitted signal is to determine the transmission losses of the receiving portion of the trunk. For example, if the signal transmitted from test circuit 107 is at 0 dBm and 1000 Hz, and is received at the far end office at −9 dBm, the craftsperson, knowing the level of the transmitted signal at the receiving office 103, determines the loss of the receiving portion of the trunk as 9 dB. Trunk test circuit 107 then transmits a tone signal to the far end office corresponding to the previously retained level, i.e., −3 dBm. This signal will be received by the craftsperson at a level of −12 dBm, reflecting the 9 dB loss of the receiving portion of the trunk. The difference in the level of the two tone signals received by the craftsperson indicates the loss of the transmitting portion of the trunk, i.e., 3 dB.

Another part of the exemplary test sequence of the McKim patent determines the noise characteristics on the particular trunk under test. During the noise measurement portion of the test sequence, an amplifier within trunk test circuit 107 is set to a high-gain level such that a noise signal greater than or equal to a predetermined level will cause a "tone present" indicating signal to be generated. As previously described, trunk test circuit 107 in accordance with the invention, may be utilized for numerous test sequences and the particular sequence described herein is merely exemplary.

Figure 2:
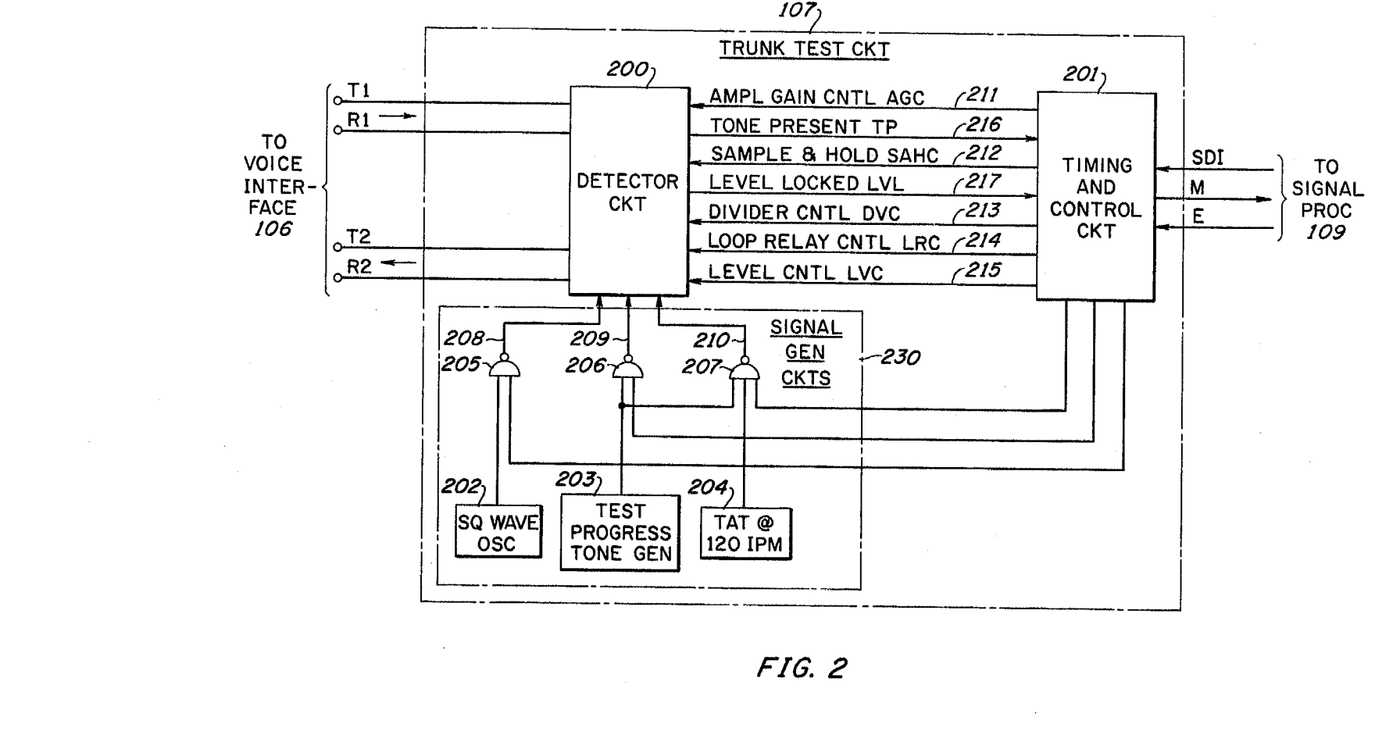
FIG. 2 is a block diagram of one illustrative embodiment of a trunk test circuit in accordance with the invention.
Figure 3:
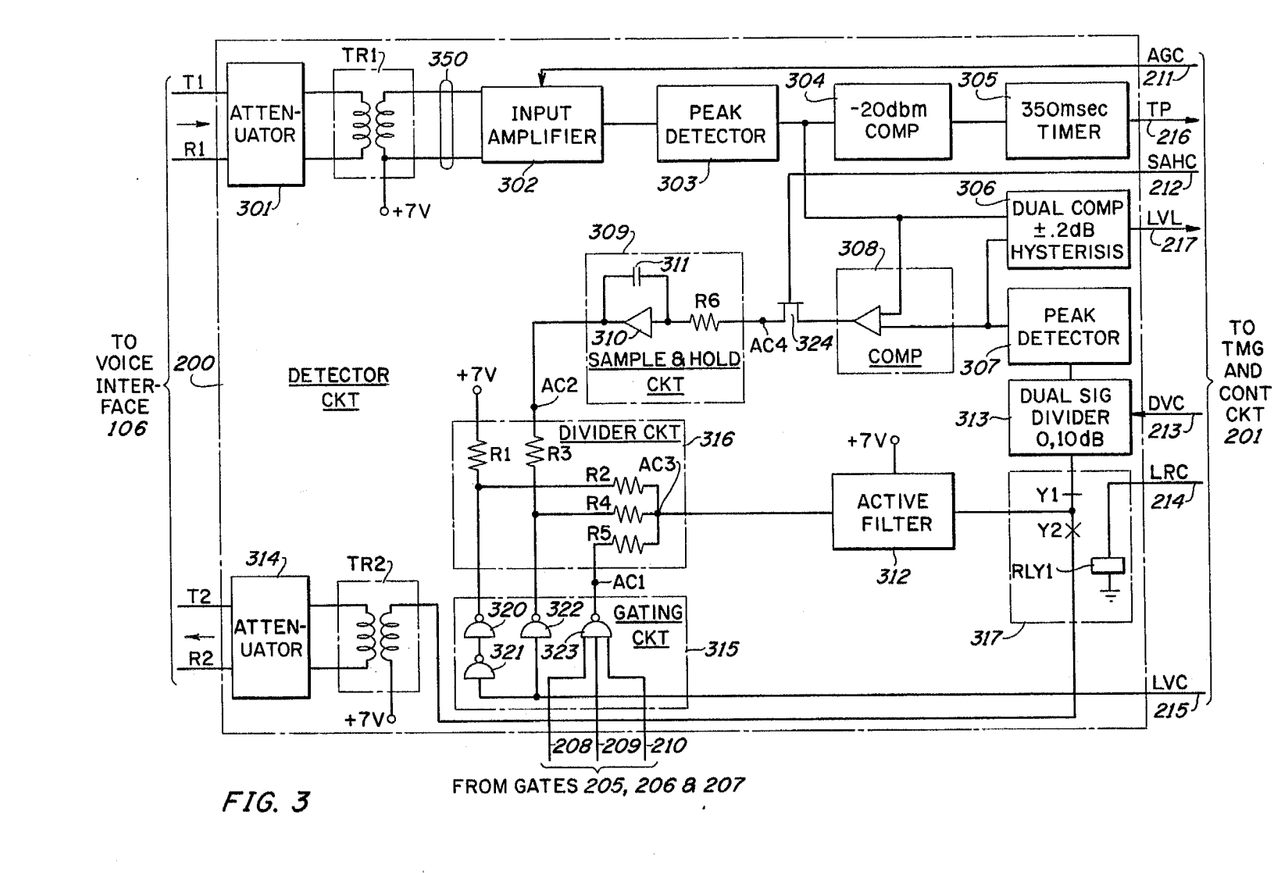
FIG. 3 is a detailed diagram of the internal circuitry of the trunk test circuit of FIG. 2.

FIG. 2 is a functional block diagram of the illustrative embodiment of trunk test circuit 107 described herein in accordance with the invention. FIG. 3 is a more detailed circuit diagram for implementing the functions of test circuit 107. As shown in FIG. 2, test circuit 107 comprises a signal generating circuit 230, timing and control circuit 201, and detection circuit 200. Generating circuit 230 comprises three signal generators 202, 203, 204, and three NAND logic gates 205, 206, and 207. As previously described with respect to FIG. 1, trunk test circuit 107 is connected to the trunk under test 102 through time division switch 105 and voice interface circuit 106. The connection of trunk test circuit 107 to voice interface circuit 106 is by means of test circuit input terminals T1, R1, and output terminals T2, R2, shown in FIG. 2. Operational control of trunk test circuit 107 is provided by the signal processor 109 and system controller 108 shown in FIG. 1. Command signals for controlling the test function sequence are generated by signal processor 109 and applied to control circuit 201 via conductors E and SDI as shown in FIG. 2. Command signals on conductor SDI initiate functional control of the test sequence via control circuit 201 while signals on conductor E provide additional information such as indications to abort the test sequence when necessary. Signals transmitted from control circuit 201 via conductor M provide acknowledgements that specific functions have been executed, such as test sequence initiation.

Timing and control circuit 201 comprise logic circuitry to sequentially activate control signals which are applied to other circuits of the trunk circuit 107. Control circuit 201 initiates timing sequences having a plurality of time durations. The logic circuitry utilized in control circuit 201 may comprise a sequence of circuits and timing counters well known in the art for providing sequential signals at various intervals of time. The three signal generators 202, 203, and 204 shown in FIG. 2 are utilized to provide signals of various frequencies during the stages of the test sequence. The output signal of each generator is applied as an input signal to one of the NAND gates 205 through 207. Further, control signals from timing and control circuit 201 are also applied to each of the NAND gates as "enable" input signals. Specifically, square-wave oscillator 202, well known in the art, generates a periodic square-wave signal having frequency $f_s$ which may be 1000 Hz as previously described. The square-wave signal and the enable signal EOSC are both applied as input signals to NAND gate 205 as shown in FIG. 2. For purposes of description, the square-wave signal and the various control signals generated from control circuit 201 are defined as having high and low state signal levels. NAND gates (e.g., gates 205, 206, and 207) are well known in the art and generate a low state output signal when all of the input signals are in a high state, and otherwise generate a high state output signal. Accordingly, the output signal of NAND gate 205 on conductor 208 corresponds to the inverse of the square-wave signal when enable signal EOSC is in a high state.

Signal generator 203 is a test progress tone (TPT) generator having an output signal with frequency $f_t$, which may be 2225 Hz as previously described. The TPT signal is applied as an input signal to both NAND gates 206 and 207 as shown in FIG. 2. When enable signal ETPT from control circuit 201 is in the high state and applied to NAND gate 206, the resultant output signal on conductor 209 is a tone signal corresponding to the inverse of the periodic pulse signal. Signal generator 204 provides a periodic binary signal having a frequency of 2 Hz and is known in the transmission testing art as a 120 IPM (interrupts per minute) signal. The periodic binary signal is applied as an input signal to NAND gate 207 as shown in FIG. 2. When enable signal E120, also applied to gate 207, is in the high state, the resultant output signal on conductor 210 is a tone signal of frequency $f_t$ which is periodically interrupted at a rate of 120 IPM. Each of the aforementioned signals on conductors 208 through 210 is applied to the detection circuit 200 as shown in FIG. 2 and utilized during specific segments of the test sequence. The test functions to which each signal pertains are described in subsequent paragraphs herein.

The detection circuit 200 comprises means for executing test functions under sequential control of timing and control circuit 201. During certain stages of the test sequence, signals originating from the previously described signal generators 202 through 204 are transmitted to remote office 101 via terminals T2, R2 shown in FIG. 2. When a test signal is to be transmitted, one of the previously described enable signals EOSC, ETPT, or E120 is generated from timing and control circuits 201 and applied to a corresponding one of NAND gates 205, 206, or 207. The resultant signal on the corresponding one of conductors 208, 209, or 210 is applied to the detection circuit 200 as shown in FIG. 2.

Timing and control circuit 201 controls the sequential execution of test functions and specifically the establishment of various circuit paths in detection circuit 200 by means of the application of control signals on conductors 211 through 215 shown in FIG. 2. Signal AGC on conductor 211 is an amplifier gain control signal and is utilized to adjust the gain of an input amplifier circuit in detection circuit 200 during the various stages of a test sequence and, particularly, during noise measurement tests. The signal SAHC on conductor 212 provides control of a "sample and hold" circuit within detection circuit 200 for retaining, for transmission at a later stage of the test sequence, the amplitude of incoming test signals received from remote telephone office 101 at input terminals T1, R1. Signal DVC on conductor 213 controls divider circuitry for establishing the test signals to be transmitted at amplitude levels having a predetermined fixed relationship to amplitude levels of received test signals. The loop relay control signal LSC on conductor 214 controls a switching mechanism in detection circuit 200 for selectively establishing various circuit paths during the stages of a test sequence. Signal LVC on conductor 215 is a level control signal for determining which of several signals having different levels of amplitude are to be transmitted to remote telephone office 101. Additionally, status signals indicative of particular occurrences during a test sequence are generated in detection circuit 200 and applied to timing and control circuits 201 as shown in FIG. 2. The signal TP on conductor 216 is a "tone present" indication signal and is generated when noise signal power on the trunk under test exceeds a predetermined power. The signal LVC on conductor 217 is a "level lock indication signal" and is generated when detection circuit 200 has ascertained the amplitude of a test signal received at terminals T1, R1, from remote telephone office 101. Each of the aforementioned control and status signals is explained in greater detail in subsequent paragraphs herein.

FIG. 3 illustrates the internal circuitry of detection circuit 200. Each portion of detection circuit 200 is described herein with relationship to its function during the various stages of the exemplary test sequence. Signal amplitudes and frequencies, and parameters of circuitry in detection circuit 200 are merely exemplary, and other parameters may be utilized in accordance with the invention. As previously described, testing of communications trunk 102 is initiated by the craftsperson at the remote telephone office 101 having a trunk test position 100. The craftsperson outpulses a directory number which is detected by detection circuits in the system controller 108. This detection mechanism is well known in the art and is not depicted herein. System controller 108 determines if a trunk test circuit is available at that particular time. While searching for a trunk test circuit and connecting the circuit to trunk 102 under test, a tone signal, designated as a "test progress tone" (TPT) is transmitted back to the remote telephone office 101 on trunk 102. In a modern electronic switching system such as the toll switching system 103 shown in FIG. 1, the means for detecting the access code from remote telephone office 101 and for determining the availability of a trunk test circuit 107 may comprise stored programs operating within the system controller 108. When a trunk test circuit 107 is found to be available, the test circuit is connected to the trunk circuit 102 via the time division switch 105 and voice interface circuit 106 as previously described. The TPT tone signal that has been transmitted to the remote telephone office 101 indicates to the craftsperson at the remote office test panel 100 that a test circuit is being "searched for" and will shortly be connected to the trunk 102 under test. The TPT tone signal being transmitted to trunk 102 at this time is not transmitted from trunk test circuit 107 but rather via means of a separate service circuit as previously described. If a trunk test circuit 107 is not available, a different signal, such as the well-known intermittent "busy" signal, indicating that all test circuits are presently in use may be returned to the remote office 101.

When the trunk test circuit 107 has been connected to trunk 102, as previously described, the TPT tone signal is removed. Subsequent transmission and reception of signals between remote telephone office 101 and switching system 103 occurs via the trunk test circuit 107 and the trunk under test 102. When the TPT tone signal is removed from the trunk under test 102, the removal is transmitted to timing and control circuits 201 via signals on conductors SDI and E shown in FIG. 2. Timing circuitry within timing and control circuits 201 then times for a period of eight seconds after the removal of the TPT signal to await the reception of further signals from remote telephone office 101 at input terminals T1 and R1 shown in FIG. 3. If no further signals are received during this time, a TPT signal at 120 IPM is applied on conductor 210 to NAND gate 323. The resultant output signal is applied through divider circuit 316 and filter 312 to test circuit output terminals T2 and R2. This signal is known to the craftsperson at remote office 101 as a "reestablish" signal and indicates that a new trunk test connection should be attempted. The aforementioned circuitry of detection circuit 200 is described in greater detail herein.

The first stage of the test sequence comprising actions occurring within trunk test circuit 107 is the reception of an incoming test signal from the remote telephone office 101 via input terminals T1 and R1 shown in FIG. 3. In many telephone switching systems well known in the art, this incoming signal is a 1000 Hz signal at 0 dBm. The test signal received from the remote telephone office 101 is applied to the attenuator circuit 301 and transformer TR1 as shown in FIG. 3. The attenuator 301 and transformer circuit TR1 are well known in the art and utilized to provide impedance isolation between the voice interface 106 and the trunk test circuit 107. One end of the secondary winding of transformer circuit TR1 is connected to a 7 volt DC source as shown in FIG. 3. This connection provides for a single-sided operation with relation to other portions of the circuitry of test circuit 107. The resultant test signal on the conductors 350 is then applied as an input signal to input amplifier circuit 302 as shown in FIG. 3. During this stage of the test sequence, the amplifier gain control signal AGC is "off" and no amplification occurs via amplifier 302 at this time. The input amplifier circuit 302 is utilized during later stages of the test sequence for noise measurement tests. The resultant output signal of input amplifier circuit 302, equal in amplitude to its input signal, is then applied to peak detection circuit 303, also shown in FIG. 3. The peak detection circuit 303 is well known in the art and provides a DC output signal having an amplitude equal to the peak amplitude of the output signal from amplifier circuit 302. The DC output signal from peak detection circuit 303 is then applied to the comparator circuit 304 shown in FIG. 3. Comparator circuit 304 comprises a single input on which the signal is compared to a signal of −20 dBm. If the input signal from the peak detection circuit 303 is greater than −20 dBm, a resultant output signal of comparator 304 is applied to timing circuit 305. The timing circuit 305 provides an output signal TP only if the signal generated by the comparator circuit 304 has a duration of time equal to or greater than 350 milliseconds. The signal TP is then applied to timing and control circuits 201 and indicates to control circuit 201 that a signal of power greater than −20 dBm has been detected. This indication assures that the incoming test signal is of sufficient strength to continue the test sequence. As previously described, further timing circuitry within timing and control circuit 201 will determine if the previously described incoming test signal from remote telephone office 101 has been received by the detection circuit 200 within eight seconds from the removal of the TPT tone by system controller 108. If the test signal was not received within the requisite period of time, a TPT signal at 120 IPM is transmitted from signal generator 204 to remote office 101 and indication signals are transmitted to signal processor 109 via conductor M shown in FIG. 2.

Assuming that the 1000 Hz test signal has been received from the remote telephone office 101, a function of detection circuit 200 is to determine the amplitude of the input signal and to adjust the amplitude of a signal to be transmitted at a later stage of the test sequence to that same level, or to a level having a specific fixed relationship to the level of the incoming test signal. Referring to FIG. 3, the level of the incoming test signal received on trunk 102 is determined by the peak detection circuit 303 as previously described and the resultant DC output signal of peak detection circuit 303 is applied to comparator circuit 304. The DC output signal is further applied as an input signal to comparator circuit 308 as shown in FIG. 3. During this stage of the test sequence, the timing and control circuit 201 enable NAND gate 205 and disable gates 206 and 207. The square-wave oscillator circuit 202 generates a square wave having a frequency $f_s$ as previously described, which is applied to NAND gate 205 as shown in FIG. 2. The resultant square-wave output signal of NAND gate 205 on conductor 208 is applied to NAND gate 323 of terminal AC1 and resistor R5 of divider circuit 316 via the gating circuits 315 as shown in FIG. 3.

Divider circuit 316 provides amplitude control capability for adjustment of signal levels and comprises a plurality of resistors R1 through R5. With level control signal LVC in the low state, circuit 316 comprises a divider circuit with electrical paths established such that terminal AC2 is connected to output terminal AC3 through a series combination of resistors R3 and R4. Further, input terminal AC1 is connected to output terminal AC3 through series resistor R5. The signal at terminal AC3 is applied as an input signal to active filter circuit 312 as shown in FIG. 3. The filter circuit 312 is well known in the art and selectively generates only the component signal having the fundamental frequency of the input signal and substantially eliminates further harmonic signals. Thus the output signal of filter 312 is a continuous stream of sinusoidal signals having the same frequency $f_s$ as the output signal of generating circuit 202 and having an amplitude proportional to the voltage at AC2. These signals are then applied to relay control circuit RLY1 as shown in FIG. 3. The relay control circuit RLY1 is well known in the art and may comprise magnetic latching relays which operate the relay contact points Y1 and Y2 shown in FIG. 3.

During this stage of the test sequence, the relay control signal LRC from timing and control circuits 201 is in a state such that the relay contact point Y1 connecting filter circuit 312 to the dual signal divider circuit 313 is closed. The output signal of filter circuit 312 is therefore applied as an input signal to the dual signal divider circuit 313. Dual signal divider circuit 313 is well known in the art and is operated by divider circuit control signal DVC from timing and control circuit 201 previously described. The signal divider circuit 313 is operated only if the incoming test signal level is less than −10 dBm. As will be described herein, an attempt is made to generate a signal which is comparable in level to that of the incoming test signal. If it is not possible to generate such signal, then it is assumed that the incoming test signal is of a level which is less than −10 dBm. In such a case, the dual signal divider circuit 313 is activated via divider signal DVC, and the output signal from active filter circuit 312 is amplified by a 10 dB gain. Regardless of whether signal divider circuit 313 is activated, its resultant output signal is applied as an input signal to peak detector circuit 307. Detector circuit 307 is similar to the previously described detector circuit 303, and generates a DC output signal having a level equal to the peak level of its input signal.

The output signals of the peak detectors 303 and 307 are each applied as input signals to comparator circuit 308 as shown in FIG. 3. Comparator circuit 308 is well known in the art and comprises circuitry to generate an output signal which has an amplitude indicative of the difference in DC levels between the output signal of peak detector circuit 303 and the output signal of peak detector circuit 307. Comparator circuit 308 is further connected to a circuit for connecting or disconnecting a conducting path between comparator 308 and control terminal AC4 connected to sample and hold circuit 309 shown in FIG. 3. In the illustrative embodiment described herein, this connection and disconnection circuit is shown as a field effect transistor (FET) 324 which is well known in the art. The FET 324 is controlled by signal SAHC previously described and applied from timing and control circuit 201. During this particular stage of the test sequence, FET 324 is in a closed state and forms a continuous conducting path between the output of comparator 308 and control terminal AC4. Thus, the output signal of comparator 308 is applied as an input signal to the sample and hold circuit 309. As shown in FIG. 3, the sample and hold circuit 309 comprises a holding circuit resistor R6 connected in series with an integrator circuit comprising a high gain operational amplifier 310 connected in parallel with a capacitor 311. The capacitor 311 of the sample and hold circuit 309 will charge or discharge until the output signal of active filter circuit 312 is substantially equal to the level of the incoming test signal.

For purposes of indication that the output signal of filter 312 has the requisite signal level, each of the output signals of peak detector circuits 303 and 307 are applied as input signals to a dual comparator circuit 306 as shown in FIG. 3. Dual comparator circuit 306 generates an output signal of a high state when each of the corresponding input signals is substantially equal to the other. As shown in FIG. 3, the dual comparator circuit 306 comprises a plus or minus 0.2 dB hysteresis characteristic for purposes of comparison of the DC signals as is well known in the art. The output signal of dual comparator circuit 306 is shown as "level locked" signal LVL which is applied to the timing and control circuit 201 shown in FIG. 2. Timing and control circuit 201 executes a timing operation when the tone present signal TP is initiated from timer circuit 305 shown in FIG. 3. If the level lock signal LVL does not occur within a predetermined period of time after signal TP has been detected, an assumption is made that it is not possible at this time to generate a test signal comparable in amplitude to that of the incoming test signal. When such indication occurs, the divider control signal DVC is activated and the dual signal divider circuit 313 is set to a 10 dB gain level as previously described. If the test signal level is still not capable of being generated at a level corresponding to the incoming test signal after a predetermined period of time, a "repeat" signal is transmitted to the remote office 101. This repeat signal may be a signal corresponding to the previously described TPT tone signal being transmitted for a specified period of time.

If the level lock signal LVL indicates that the test signal has been generated at a level corresponding to the incoming test signal, then the sample and hold control signal SAHC is activated to open the conducting path that was established via FET 324. Capacitor 311 then holds a signal voltage which is sufficient to supply test output signals having an amplitude substantially equal to the amplitude of the prior incoming test signal.

The signal indicating that an incoming test signal is present, i.e., signal TP from timer circuit 305, is also utilized by timing and control circuit 201 to assure that the incoming test signal does not exist for greater than a predetermined duration of time. If the incoming test signal does exist for a period of time greater than this predetermined time, a "reestablish" signal comprising the TPT signal at 120 IPM will be transmitted to the remote office 101. The previously described stage of the test sequence corresponding to the retention of a signal level corresponding to the incoming test signal level may also comprise a test to determine if an automatic test is being executed by the remote office 101 rather than utilization of a craftsperson at the test position 100 previously described and shown in FIG. 1. In the test sequence described in the McKim et al. patent, an indication that an automatic test is being executed is performed by generating a "burst" of 1000 Hz signal for a period of time substantially equal to 350 milliseconds approximately 2 seconds after the removal of the previously described 1000 Hz incoming test signal utilized to determine the signal level to be subsequently transmitted. The determination as to whether an automatic test is being executed or whether a craftsperson is being utilized at the remote office 101 is necessary for purposes of later stages of the test sequence to be described herein.

The next stage of the test sequence comprises the transmission of a signal to the remote office 101 at a predetermined frequency and signal level, for example, a signal at 0 dBm and 1000 Hz. To generate this outgoing test signal, the enable signal EOSC is activated and the square-wave signal generated by the previously described signal generating circuit 202 is applied on conductor 208 to the NAND gate 323 within gating circuits 315 shown in FIG. 3. The relay control signal LRC is applied to relay control circuit RLY1 such that an open path exists between the active filter circuit 312 and the dual signal divider circuit 313. Further, a conducting path is established between the filter circuit 312 and transformer TR2. Transformer TR2 operates in a similar manner to the previously described transformer TR1 and provides single-sided operation via the utilization of a 7 volt DC signal applied to one end of the transformer. The output signals of the transformer TR2 are then applied to attenuator circuit 314, similar in operation to the previously described attenuator circuit 301. The output signals of the attenuator circuit 314 are applied to the test circuit output terminals T2 and R2 which are connected through the time division switching system 103 to the trunk 102 as previously described and depicted in FIG. 1. Referring again to FIG. 3, the level control signal LVC from timing and control circuit 201 is in a state such that the divider circuit 316 comprises a 7 volt source connected to a series combination of resistors R1 and R2 with one end of resistor R2 connected to the previously described output terminal AC3. The output signal of NAND gate 323 and gating circuits 315 is applied to the output terminal AC3 via input terminal AC1 and resistor R5. The values of the resistances R1, R2, and R5 may be chosen to supply the requisite signal level at output terminal AC3. By transmitting to the remote office 101 a signal of known level and frequency, the craftsperson may determine the loss of the receiving portion RM1 of the communications trunk 102. For example, if the transmitted test signal is at 1000 Hz and 0 dBm, and the signal received by the craftsperson is a $-3$ dBm signal, the craftsperson may then ascertain that the loss of this portion of trunk 102 is 3 dB.

Following the transmission of the previously described signal, the circuitry of detention circuit 200 is established to transmit the previously retained signal from the voltage retained on capacitor 311. To execute this stage of the test sequence, the filter circuit 312 is again connected in a conducting path to the test circuit output terminals T2 and R2 via the relay control circuit RLY1, transformer TR2, and attenuator circuit 314. If the dual signal divider circuit 313 had been required to be activated in a state such that a 10 dB gain was associated with the relationship between its incoming and outgoing signals, an indication of this gain is transmitted to the remote office 101 by the transmission of a TPT tone signal for a predetermined period of time. The gating circuit 315 and the signal generating circuits 230 are activated to be in the same state as existed when the incoming test signal level was retained within sample and hold circuit 309 as previously described. The signal is transmitted to the remote office 101 during this stage of the test sequence and is transmitted for a predetermined period of time as controlled by operations of timing and control circuit 201. The transmission of this signal allows the craftsperson at the test panel 100 of remote office 101 to determine the transmission loss associated with the transmitting portion TM1 of trunk 102 which has been connected to the test input terminals T1 and R1. For example, if the signal transmitted to the craftsperson at this time is received at a level of $-12$ dBm, the craftsperson, by knowing that the loss associated with the portion of the trunk 102 connected to test circuit output terminals T2 and R2 is $-3$ dB as previously described, it may be determined that the loss of the TM1 portion of trunk 102 connected to test circuit input terminals T1 and R1 is 12 dB minus 3 dB or a 9 dB loss. After the retained signal has been transmitted to the remote office 101, a waiting period of a predetermined time is utilized if the test sequence comprises an automatic test at the remote office 101, i.e., a craftsperson is not utilized at the test panel 100. During this waiting period, a signal may be received from the remote office 101 which would indicate that the test signal previously transmitted via the test circuit output terminals T2 and R2 must be repeated.

The final stage of the test sequence comprises a noise measurement test. To execute this sequence, the automatic gain control signal AGC is applied to the previously described input amplifier circuit 302. Input amplifier circuit 302 provides a high gain facility for measuring incoming noise signals. In accordance with the invention, a threshold noise level of any specific value required may be utilized. If the noise which is measured by the previously described peak detection circuit 303 and comparator circuit 304 does not exceed a predetermined level, a signal may be transmitted via the test circuit output terminals T2 and R2 indicating this fact. For example, if the noise measurement does not exceed the predetermined value, a steady TPT tone signal may be applied on conductor 209 to the gating circuits 315 and then further applied to the test circuit output terminals via transformer TR2 and attenuator circuit 314. If the noise measurement exceeds the predetermined value, a TPT tone signal at 120 IPM may be applied to conductor 210 and then further applied through the previously described circuitry to test circuit output terminals T2 and R2. Each of these noise measurement indication signals applied to the test circuit output terminal T2 and R2 are continuously applied until the system controller circuit 108 receives an indication that the trunk 102 has been released by the craftsperson at the test panel 100. When this release occurs, the signal processor 109 transmits a signal on conductor SD1 indicating that the release has occurred and the test should be terminated.

As shown in FIG. 3, the gating circuits 315 comprise NAND gates 320 through 323. NAND gates 320 and 321 comprise a double inverter circuit which is utilized for purposes of control of the application of the 7 volt DC source to divider circuit 316. Similarly, NAND gate 322 comprises an inverter circuit utilized for purposes of control of the application of signals at terminal AC2 of the divider circuit 316. If the open collector type gates are utilized within the circuitry previously described, it is then possible to have circuit operation independent of the amplitude signals generated by the previously described signal generating circuits 230. Open collector gates are well known in the art and provide binary signal levels which are independent of the levels of input signals applied thereto.

It is to be understood that the above-described arrangement is merely an illustrative application of the principles of the invention; numerous other arrangements may be devised by those skilled in the art without departing from the spirit and scope of the invention.

What is claimed is:

1. A trunk test circuit (107) having test circuit input and output terminals (T1, R1, T2, R2) connectible to a communications trunk (102) for measuring transmission characteristics thereof and comprising circuit means (200) connected to said input and output terminals (T1, R1, T2, R2) for generating on said output terminals (T2, R2) outgoing test signal having an amplitude corresponding to the amplitude of an incoming test signal occurring on said input terminals (T1, R1) at a time subsequent to the time of occurrence of said incoming test signal characterized in that said circuit means (200) comprises:

variable amplitude signal generating means (230, 309, 315, 316) having a control terminal and an output terminal for generating a continuous stream of test signals;

comparison means (308) having input terminals connected to said output terminal of said variable amplitude generating means and to said test circuit input terminals (T1, R1) and having an output terminal connected to said control terminal for generating a comparator signal indicative of the difference in amplitude between said incoming test signal and said signals of said continuous stream of test signals;

said signal generating means being responsive to said comparator signal to adjust the amplitude of said signals of said continuous stream of test signals to reduce said difference in amplitude;

means (201, 306, 324) for disconnecting said comparison means from said signal generating means when said incoming test signal is substantially equal in amplitude to said adjusted test signal; and means (201, RLY1) for connecting said output terminal of said signal generating means (309, 316) to said test circuit output terminals (T2, R2).

2. A trunk test circuit (107) in accordance with claim 1 characterized in that said variable amplitude signal generating means comprises:

signal generating circuit means (230) for generating time variant signals having predetermined signal characteristics;

holding circuit means (309) connected to said control terminal and responsive to said comparator signal for retaining a signal voltage indicative of the amplitude of said incoming test signal;

divider circuit means (316) connected to said signal generating circuit means and holding circuit means and responsive to said retained signal voltage to adjust the amplitude of said signals of said continuous stream of test signals.

3. A trunk test circuit in accordance with claim 2 characterized in that said holding circuit means comprises a resistor (R6) having one terminal connected to said control terminal and further connected in series combination with an integrator circuit (310, 311) comprising an operational amplifier (310) connected in parallel combination with a capacitor (311) and further connected to said output terminal of said holding circuit means wherein said retained signal voltage is retained across said capacitor (311).

4. A trunk test circuit in accordance with claim 2 characterized in that said divider circuit means comprises:

a first resistance (R3, R4) connected between said output terminal of said holding circuit means and said output terminal of said variable amplitude signal generating means and a second resistance (R5) is connected between said signal generating circuit means and said output terminal of said variable amplitude signal generating means.

5. A trunk test circuit in accordance with claim 4 characterized in that said divider circuit further comprises an input terminal connectible to a voltage source and a third resistance (R1, R2) connected between said input terminal connectible to said voltage source and said output terminal of said variable amplitude signal generating means, and said variable amplitude signal generating means further comprises control circuits (320, 321, 322) for controlling said divider circuit to be selectively responsive to said voltage source and said holding circuit means.

6. A trunk test circuit in accordance with claim 2 characterized in that said variable amplitude signal generating means further comprises logic means (323) connected between divider circuit means and said signal generating circuit means wherein said logic means is adapted to generate output signals having predetermined signal levels.

7. A trunk test circuit in accordance with claim 6 characterized in that said signal generating means comprises a plurality of signal sources (202, 203, 204) and means (205, 206, 207) for selectively applying signals from said sources to said logic means.

8. A trunk test circuit in accordance with claim 1 characterized in that said circuit means further comprises timing means (305) connected to said test circuit input terminals and responsive to said incoming test signal for generating a timer signal indicative of the presence of said incoming test signal for at least a predetermined period of time and said test circuit further comprises control means (201) responsive to said timer signal to generate control signals for said circuit means.

9. A trunk test circuit in accordance with claim 8 characterized in that said circuit means further comprises input amplifier means (302) responsive to an amplifier gain control signal generated by said control means for amplifying test signals applied to said test circuit input terminal.

10. A trunk test circuit in accordance with claim 8 characterized in that said circuit means further comprises a first peak detection circuit (303) connected to said test circuit input terminal for generating a first peak output signal corresponding to the maximum amplitude of said incoming test signal and a second peak detection circuit (307) connected to said variable amplitude signal generating means for generating a second peak output signal corresponding to the maximum amplitude of said continuous stream of test signals;

said circuit means further comprising additional comparison means (306) responsive to said first and said second peak output signals for applying a level indication signal to said control means indicative of said first peak output signal being within a predetermined difference in amplitude from the amplitude of said second peak output signal;

said control means beng further responsive to said level indication signal to generate said control signals for said circuit means.

11. A trunk test circuit in accordance with claim 10 characterized in that said circuit means further comprises a power comparison circuit (304) responsive to said first peak output signal for generating a power comparison signal when the amplitude of said first peak output signal is less than a predetermined amplitude;

said timing means being responsive to said power comparison signal to generate said timer signal.

12. A trunk test circuit (107) in accordance with claim 10 characterized in that said circuit means (200) comprises a signal divider circuit (313) connected to said variable amplitude signal generating means and responsive to said control signals of said control means (201) for amplifying said continuous stream of test signals when said incoming test signal has an amplitude less than a predetermined amplitude.

13. A trunk test circuit in accordance with claim 10 characterized in that said means for disconnecting said comparison means from said variable amplitude signal generating means comprises a field effect transistor (324) connected between said comparison means and said variable amplitude signal generating means, said field effect transistor being responsive to said control signals applied from said control means for connecting or disconnecting a conducting path between said comparison means and said variable amplitude signal generating means.

14. A trunk test circuit in accordance with claim 1 characterized in that said circuit means further comprises filtering means (312) connected to said output terminal of said variable amplitude signal generating means for generating harmonic component signals of said continuous stream of test signals.

* * * * *